US012578681B2

(12) United States Patent
Papi et al.

(10) Patent No.: US 12,578,681 B2
(45) Date of Patent: Mar. 17, 2026

(54) MEMBER FOR CONTROLLING A PLURALITY OF FUNCTIONS OF A TIMEPIECE MOVEMENT

(71) Applicant: Manufacture d'Horlogerie Audemars Piguet SA, Le Brassus (CH)

(72) Inventors: Giulio Papi, La Chaux-de-Fonds (CH); José-Manuel Fernandez, Le Brassus (CH)

(73) Assignee: MANUFACTURE D'HORLOGERIE AUDEMARS PIGUET SA, Le Brassus (CH)

( * ) Notice: Subject to any disclaimer, the term of this patent is extended or adjusted under 35 U.S.C. 154(b) by 318 days.

(21) Appl. No.: 18/261,574

(22) PCT Filed: Jan. 18, 2022

(86) PCT No.: PCT/EP2022/051007
§ 371 (c)(1),
(2) Date: Jul. 14, 2023

(87) PCT Pub. No.: WO2022/175002
PCT Pub. Date: Aug. 25, 2022

(65) Prior Publication Data

US 2024/0077834 A1 Mar. 7, 2024

(30) Foreign Application Priority Data

Feb. 16, 2021 (CH) .................................... 00150/21

(51) Int. Cl.
*G04B 3/04* (2006.01)
*G04B 27/00* (2006.01)
*G04F 7/08* (2006.01)

(52) U.S. Cl.
CPC .......... *G04B 3/046* (2013.01); *G04B 27/004* (2013.01); *G04F 7/08* (2013.01)

(58) Field of Classification Search
CPC ...... G04B 3/046; G04B 27/004; G04B 3/048; G04B 27/06; G04B 27/04; G04B 37/106;
(Continued)

(56) References Cited

U.S. PATENT DOCUMENTS 3,418,800 A 12/1968 Kiyoshi
3,977,178 A 8/1976 Wenger
(Continued)

FOREIGN PATENT DOCUMENTS

CH 706232 A2 9/2013
CH 706888 A2 3/2014
(Continued)

OTHER PUBLICATIONS

International Search Report for PCT/EP2022/051007 mailed May 13, 2022, 6 pages.
(Continued)

*Primary Examiner* — Edwin A. Leon
(74) *Attorney, Agent, or Firm* — NIXON & VANDERHYE

(57) ABSTRACT

A multi-function control member of a timepiece movement includes a crown and rotationally integral control stem that is integral in rotation with a first actuating device of a first function. Under pressure, the crown moves axially between rest and depressed positions in which a second function is actuated, and to return to its rest position when the pressure is released. In rest position, the crown moves in axial rotation between stable and actuating angular positions to actuate, by crown rotation, the first function via control stem rotation. The control stem is integral axially with the crown to move in axial translation with it during movement into its depressed position, and to be free in axial translation relative to the first actuating device. The control stem cooperates with a second actuating device of the second function when
(Continued)

the crown moves into its depressed position to actuate the second function.

22 Claims, 6 Drawing Sheets

(58) Field of Classification Search
CPC ........... G04F 7/08; G04C 3/002; G04C 3/004; G04G 21/08
See application file for complete search history.

(56) References Cited

U.S. PATENT DOCUMENTS

| | | | | |
|---|---|---|---|---|
| 8,371,745 | B2 | 2/2013 | Manni | |
| 11,243,498 | B2 * | 2/2022 | Kwiecinski | G04B 3/041 |
| 11,385,598 | B2 * | 7/2022 | Zanesco | G04C 3/004 |
| 11,809,139 | B2 * | 11/2023 | Kanmaz | G04B 37/103 |

FOREIGN PATENT DOCUMENTS

| | | | |
|---|---|---|---|
| CH | 711600 | A1 | 4/2017 |
| EP | 1939699 | A1 | 7/2008 |
| WO | 2005038538 | A1 | 4/2005 |

OTHER PUBLICATIONS

Written Opinion of the ISA for PCT/EP2022/051007 mailed May 13, 2022, 6 pages.

* cited by examiner

MEMBER FOR CONTROLLING A PLURALITY OF FUNCTIONS OF A TIMEPIECE MOVEMENT

CROSS-REFERENCE TO RELATED APPLICATIONS

This application is the U.S. national phase of International Application No. PCT/EP2022/051007 filed Jan. 18, 2022 which designated the U.S. and claims priority to CH 00150/21 filed Feb. 16, 2021, the entire contents of each of which are hereby incorporated by reference.

TECHNICAL FIELD

The present invention relates to a control member of a plurality of different functions of a timepiece movement, said control member comprising a crown and a control stem designed to be integral at least in rotation with said crown, said control stem being integral in rotation with a first actuating device of a first function, said crown being designed in order, in response to a pressure, to be movable in axial translation between a rest position and a depressed position in which a second function, separate from the first function, is actuated, and to return to its rest position when the pressure on the crown ceases, the crown also being designed to be, in the rest position, movable in axial rotation in at least one direction between at least one stable angular position and at least one actuating angular position so as to actuate, by rotation of said crown in said direction, said first function via the rotation of said control stem.

The present invention also relates to a timepiece comprising at least one such control member.

PRIOR ART

Such a control member is used, for example, in a control device with a push-piece crown described in the publication WO 2005/038538. In this device, the crown is designed to be able to occupy a neutral position in order to actuate the winding, a pulled position in order to actuate the hand-setting, and a pushed position in order to actuate a third function. The control stem is constituted by the winding and hand-setting stem of a traditional watch which can be moved axially between its neutral position for the winding and its pulled position for the hand-setting. In order to actuate the third function, a specific crown is provided, in which an extension tube is added to the end of a push-piece tube in order to be able to activate a control member inside the watch independently of the winding and hand-setting stem which remains immovable. The disadvantages of this device are, in particular, a complex construction of the crown as well as an adjustment of the position of the crown relative to the control member in order not to have an untimely actuation.

Other control members of the push-piece button type also exist, which are used in complication timepieces in order to actuate different functions of the complications. For example, a timepiece comprising a chronograph mechanism comprises, in general, two different push-piece buttons for the chronograph functions: one for STARTING/STOPPING the chronograph and the other for its zero-resetting. In addition to these two push-piece buttons, the timepiece can comprise other control members such as stems, other push-pieces or other slides in order to carry out different correction functions or complication selection functions. The timepiece, especially when it is a wristwatch, then comprises around its middle numerous control members for the complications, adding to any winding stem, which increases the complexity of the construction as well as tightness problems relating to the case. The multitude of control members distributed around the middle is also detrimental to the aesthetics of the watch.

In order to resolve these problems, it has been proposed that the number of control members be reduced by concentrating different functions on the same control member. For example, control stems integrating a push-piece in order to form two coaxial control members have been proposed.

Document CH 711 600 describes, for example, a crown having a push-piece of the standard type comprising a push-piece which is axially movable relative to the crown which, as such, is therefore not movable in axial translation between a rest position and a depressed position in order to control an actuating member of a mechanism. The device comprises a control stem connected to the movement for the winding and the hand-setting and actuated by the crown via a central extension. Another tube actuated by the push-piece independently of the control stem and the crown is provided in order to control the actuating member.

Numerous multifunctional control mechanisms have also been proposed, in which one or other of the rotational or translational movements serves to select a function and the other movement serves to actuate it, the two actions being associated with the same function. In general, these mechanisms have a complex construction and a complex operation.

A wrist-top computer comprising a case, a two-function control member comprising a crown and a control stem which can be moved axially and radially, an axial switch designed to switch on from an axial movement of the crown and a radial switch designed to switch on from a radial movement of the crown by means of a toothed wheel which cooperates with the control stem in order to transmit the radial movement of the crown to the radial switch, is also known from U.S. Pat. No. 8,371,745. The control member is designed to transmit a radial movement of the crown to the radial switch in order to browse values which are displayed on a dial, an alarm time for example, and in order to transmit the axial movement of the control stem to the axial switch in order to validate the chosen value. Here again, the two rotational and translational actions of the control member are linked to the same function. It will therefore be necessary to multiply the number of control members in order to be able to control different functions.

The present invention aims to remedy, at least in part, these drawbacks by proposing a single control member which makes it possible to control different functions of a timepiece movement, one of the functions being controlled by said control member in the manner of a push-piece.

More particularly, an object of the present invention is to propose a control member of the chronograph push-piece type which makes it possible to control functions present in the timepiece, which are independent of the chronograph mechanism.

Another object of the present invention is to propose a control member which makes it possible to prevent the control of one or other of the functions.

DISCLOSURE OF THE INVENTION

For this purpose, the invention relates to a control member of a plurality of different functions of a timepiece movement, said control member comprising a crown and a control stem designed to be integral at least in rotation with said crown, said control stem being integral in rotation with a first actuating device of a first function, said crown being designed in order, in response to a pressure on the crown, to be movable in axial translation between a rest position and a depressed position in which a second function, separate from the first function, is actuated, and to return to its rest position when the pressure on the crown ceases, the crown also being designed to be, in the rest position, movable in axial rotation in at least one direction between at least one stable angular position and at least one actuating angular position so as to actuate, by rotation of said crown in said direction, said first function via the rotation of said control stem.

According to the invention, said control stem is designed so as to likewise be integral in axial translation with said crown so as to be movable in axial translation with the crown during the movement of said crown into its depressed position, and to be free in axial translation relative to the first actuating device during the movement of said crown into its depressed position, said control stem furthermore being designed to cooperate with a second actuating device of said second function during the movement of said crown into its depressed position in order to actuate said second function.

Thus, the invention makes it possible to control two different functions such as two functions of different complications, which are independent of one another, by means of a single control member, one of the functions being controlled by said control member in the rest position just like a control stem and the other of the functions being controlled by said control member in the depressed position just like a push-piece, but by means of one and the same control stem which is always made integral in movement (in rotation and in translation) with the crown in the rest position and in the depressed position. The crown and the control stem thus constitute one and the same control member which advantageously makes it possible to control two actuating devices for two separate functions. Thus, the present invention proposes a simple and robust control mechanism which is more economical to implement.

Advantageously, the control member includes a security device designed to prevent the axial translation of the crown when it is not in a stable angular position and to prevent the axial rotation of the crown when it is not in its rest position and, in particular, when it is in its depressed position.

Thus, the control member is secure, by preventing in particular the control of the first function when the second function is active.

According to a first preferred embodiment, the first function is the selection of a form of striking of a striking-mechanism and the second function is the START/STOP function of a chronograph mechanism.

According to another preferred embodiment, the first function is the correction of the month of a month indicating mechanism and the second function is the zero-resetting or flyback function of a chronograph mechanism.

The present invention also relates to a timepiece comprising at least one control member as described above.

BRIEF DESCRIPTION OF THE DRAWINGS

Other characteristics and advantages of the present invention will appear on reading the following detailed description of a plurality of embodiments of the invention, which are provided by way of non-limiting examples, with reference to the appended drawings in which.

EMBODIMENTS OF THE INVENTION

Figure 1:
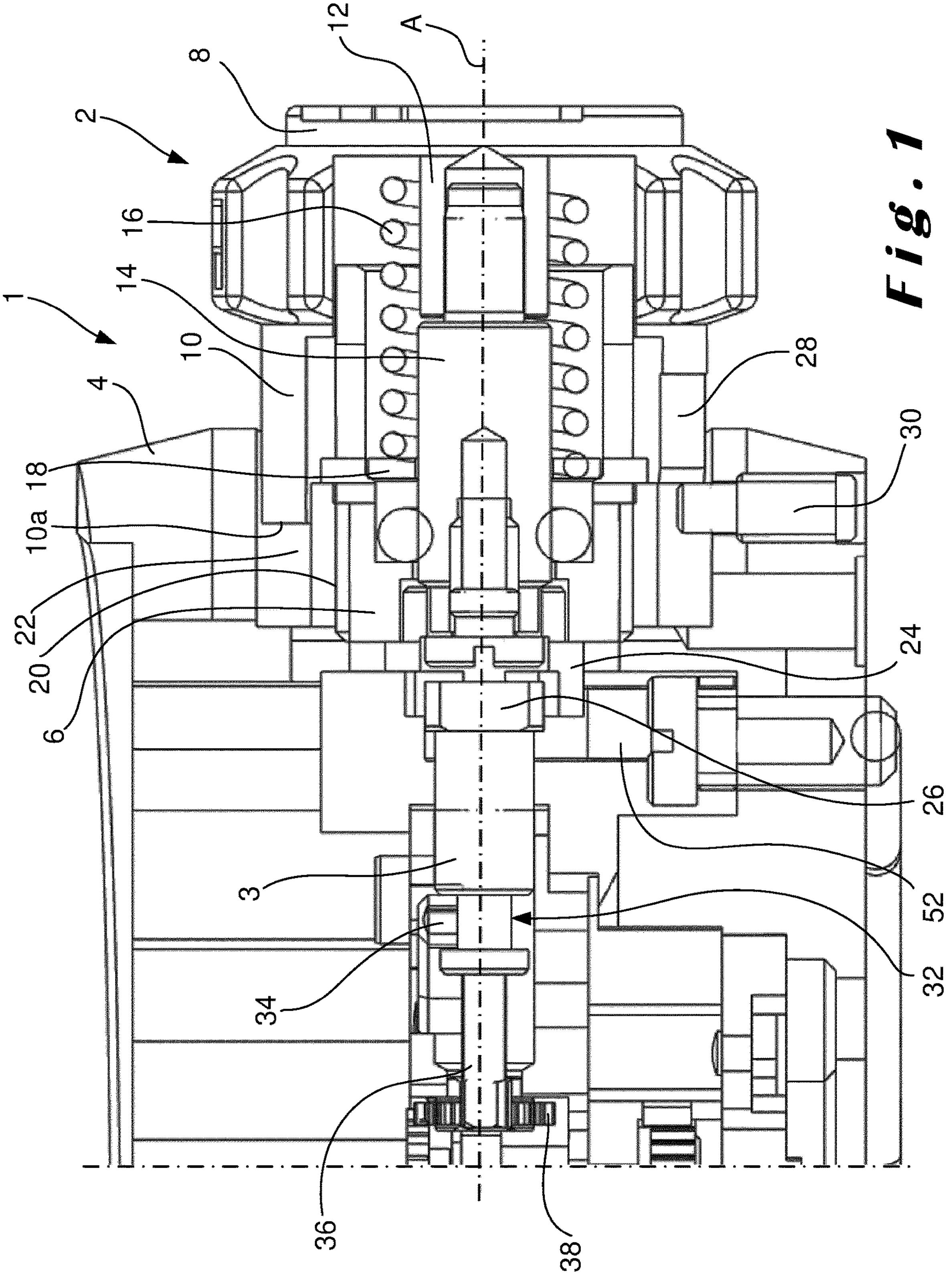
FIG. 1 is a cutaway view of the control member according to the invention, said control member being in the rest position.
Figure 2:
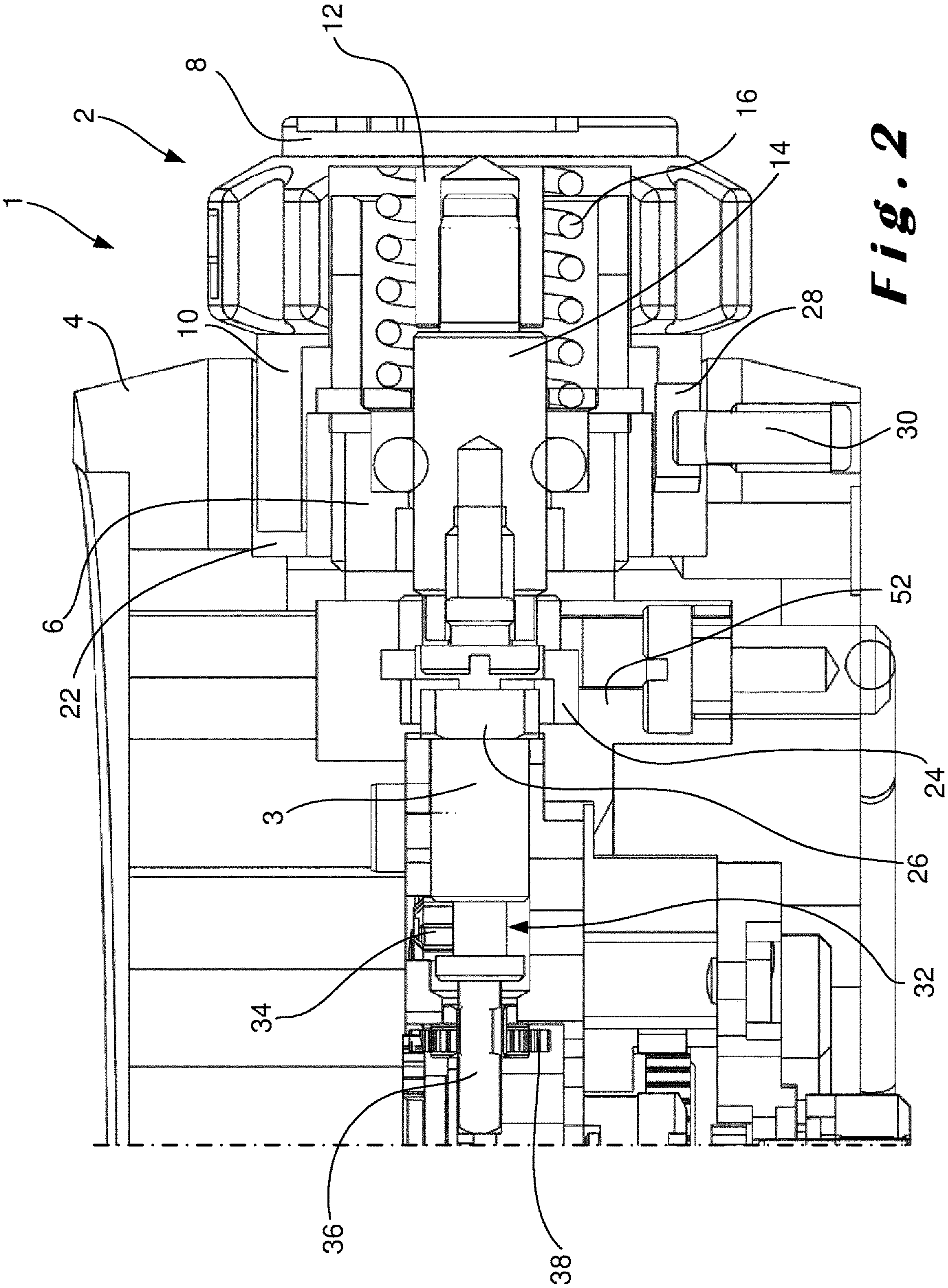
FIG. 2 is a cutaway view of the control member according to the invention, said control member being in the depressed position.
Figure 3:
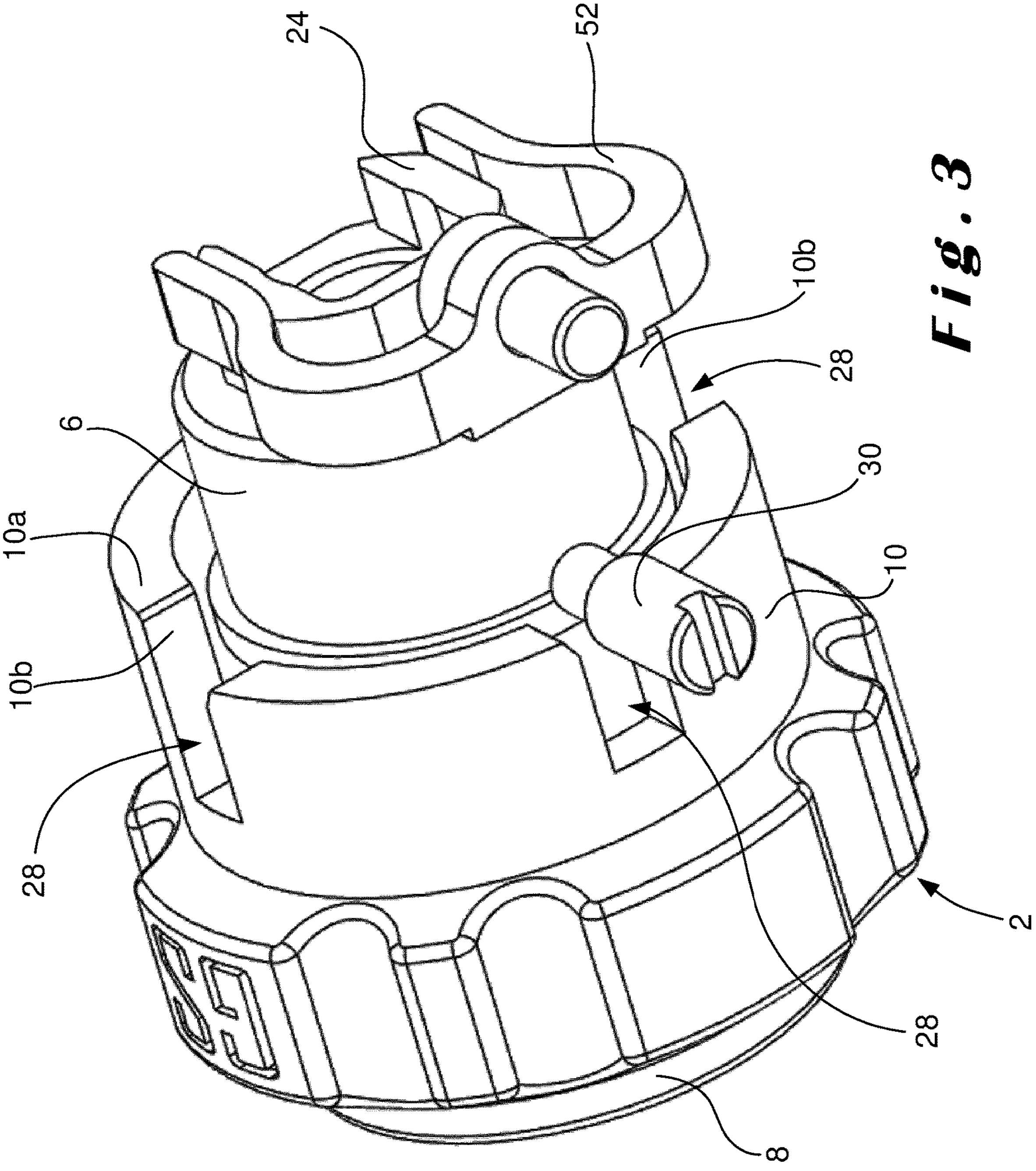
FIG. 3 is an isometric view of the crown of the control member according to the invention.

With reference to FIGS. 1 to 3, the present invention relates to a control member 1 of a plurality of different functions of a timepiece movement, said control member 1 comprising a crown 2 and a control stem 3 which is made integral at least in rotation with said crown 2. The control member 1 is mounted on the middle 4 of a watch case of a timepiece such that said crown 2 goes beyond the middle 4.

The control stem 3 is itself integral in rotation with a first actuating device of a first function, examples of which will be detailed below.

The crown 2 is designed, in response to a pressure on said crown 2, to be movable in axial translation between a rest position depicted in FIG. 1 and a depressed position depicted in FIG. 2, in which a second function, separate from the first function, is actuated, and to return to its rest position when the pressure on the crown 2 ceases. In the present description, the “rest position” is defined relative to the movement in axial translation of the crown 2, the rest position then being defined as a non-depressed position which the crown assumes when it is not subjected to a pressing force, the rest position denoting all of the positions in which the crown 2 is not located in the depressed position.

The crown 2 is also designed, in its rest position, to be movable in axial rotation, with the control stem 3, in at least one direction between at least one stable angular position and at least one actuating angular position so as to actuate, by rotation of said crown 2 in said direction, said first function via the rotation of said control stem 3.

In accordance with the invention, the control stem 3 is designed so as to likewise be integral in axial translation with said crown 2 so as to be movable in axial translation with the crown 2 during the movement of said crown 2 into its depressed position, and to be free in axial translation relative to the first actuating device, said control stem 3 being designed to cooperate with a second actuating device of said second function during the movement of said crown 2 into its depressed position so as to actuate said second function.

Thus, the crown 2 and the control stem 3, once mounted as will be detailed below, are always integral in movement (in rotation and in translation) whether the crown 2 is in its rest position or in the depressed position, thus constituting one and the same control member 1. In the remainder of the description, the expressions "rest position" and "depressed position" are used both for the crown 2 and for the control member 1 in its entirety, the control stem 3 always following the movements of the crown 2, whatever they may be.

For this purpose, the crown 2 includes a guide tube 6 intended to be fixed by screwing or driving in the middle 4. The tube 6 has a revolution symmetry relative to a longitudinal axis A constituting the translational and rotational axis of the control member 1.

The crown 2 also includes a head 8, an axial skirt 10 integral with the head, and a pipe 12 integral with the head 8, said assembly having a revolution symmetry around the axis A.

The crown 2 also includes a piston 14 housed, on the one hand, inside the pipe 12 and, on the other hand, in the center of the tube 6, said piston 14 being designed to be integral in movement with the pipe 12. A spring 16 is disposed in a cavity formed between the pipe 12 and the head 8 and between the tube 6 and the piston 14. The spring 16 is designed to be compressed axially between the head 8 and a shoulder 18 of the tube 6 when a pressure is exerted on the crown 2 in order to move the crown 2, and therefore the control member 1 also comprising the control stem 3, into its depressed position, and to make it possible to return the crown 2 to its rest position when the pressure on the crown 2 ceases.

The piston 14 and the pipe 12 are mounted movably in the tube 6, the head 8 and the skirt 10 being mounted movably around the tube 6. The middle 4 comprises, around the orifice 20 in which the tube 6 is mounted, a circular groove 22 in which the skirt 10 engages and in which the skirt 10 can move in rotation and in translation along the axis A.

The piston 14 kinematically links the head 8 to the control stem 3 by means of a female driving square 24 fixed to the piston 14 by screwing, and into which female driving square a male square 26 provided at the end of the control stem 3 fits. The square end of the control stem 3 is slid, during the mounting of the movement in the case, into the driving square 24 by its open face. Once fitted, the female square 24 of the crown 2 continually drives the male square of the control stem 3 in rotation. The back of the driving square 24 pushes the end of the control stem 3 in axial translation into the depressed position when a pressure is exerted on the crown 2. The control stem 3 has its own return spring which holds its square end in the driving square 24 in order to return the control stem 3 when the pressure ceases.

The control member 1 (crown 2+control stem 3) can thus be moved in axial translation along the axis A into its depressed position by a user just like a push-piece and can be turned around the axis A just like a control stem in order to control two different functions of the timepiece and, more precisely, functions of two different complications, as will be described in greater detail below.

In the present description, the expression "two different functions" means that these functions do not have a kinematic link between them, other than the link via the control stem 3.

More particularly, the timepiece comprises a first complication, the first function being linked to this first complication and being able to be, for example, a selection function, the actuating angular position(s) being one or more stable angular position(s) corresponding to one or more function selection position(s). For example, the timepiece can comprise a striking-mechanism, the first function being a striking selection function. The first function can also be a correction function of a mechanism, the actuating angular position(s) being one or more unstable angular position(s) corresponding to one or more correction position(s) of the mechanism. For example, the timepiece can comprise an indicating mechanism for the month, the first function being a correction function for the month.

The timepiece comprises a second complication like a chronograph mechanism, and the second function is one of the chronograph functions such as the START/STOP function, the zero-resetting or flyback function.

Any other appropriate complication can be used.

In the present invention, the control member (crown 2+control stem 3) is designed to move axially solely between its rest position and its depressed position. It cannot be moved into a pulled position, like a standard winding stem. For this reason, the first function cannot be either a traditional winding function or a traditional hand-setting function.

Advantageously, the control member 1 is movable in axial rotation through an angle of less than 360°, preferably less than 180° and, more preferably, less than or equal to 90° or 60°, in one rotational direction, as will be described in detail below.

Moreover, the different angular positions assumed by the control member 1 are separate angular positions, between which the control member 1 does not remain.

Advantageously, the control member 1 includes a security device designed to prevent the axial translation of the crown 2, and therefore of the control member 1, when it is not in a stable angular position and to prevent the axial rotation of the crown 2, and therefore of the control member 1, when it is not in its rest position and, in particular, when it is in its depressed position.

For this purpose, the security device comprises at least one axial notch 28 formed parallel to the axis A in the lateral wall of the skirt 10 and in which a fixed guide pin 30 is intended to engage in order to prevent the axial rotation of the crown 2, and therefore of the control member 1, when it is not in its rest position and, in particular, when it is in its depressed position, as shown in FIG. 2.

The pin 30 is carried by the middle 4 and is designed to be able to cooperate with the security device provided on the control member 1. For this purpose, the pin 30 projects from the wall of the middle 4 in the direction of the crown 2 of the control member 1, the longitudinal axis of the pin 30 being perpendicular to the axis A of the control member 1.

Furthermore, the skirt 10 of the crown 2 is designed so that its solid lower edge **10*a* is intended to be substantially in abutment against the pin 30 when the crown 2, and therefore the control member 1, is in the rest position, preventing any movement in axial translation of the crown 2, and therefore of the control member 1, towards the depressed position as long as one of the notches 28 is not opposite said pin 30**.

Advantageously, the skirt 10 can be longer on a certain angular sector, beyond the angular sector comprising the notches 28 so that the longer wall **10*b* defines an abutment for the pin 30, limiting the angle of axial rotation of the control member 1. A longer wall of the skirt 10 can be provided on a sector of 180° in order to constitute two abutments limiting the rotation of the control member 1 to an angle of 180°, which can be 90° in one direction and 90° in the other direction. In another variant, a longer wall of the skirt 10 can be provided on a sector of 240° in order to constitute two abutments limiting the rotation of the control member 1** to an angle of 120°, which can be 60° in one direction and 60° in the other direction.

Thus, when the pin 30 is opposite a notch 28, a pressure on the crown 2 will make it possible to actuate the second function.

When the pin 30 is between two notches 28, a pressure on the crown 2 does not make it possible to release the second function.

In both these cases, the control member 1 being in the rest position as in FIG. 1, a rotation of the control member 1 in order to actuate the first function is possible because the pin 30, positioned just below the angular sector of the skirt 10 comprising the notches 28, does not prevent a rotation of the control member 1 being effected, which can be bidirectional, until said pin 30 abuts against one of the longer walls of the skirt 10.

When the pin 30 is at the back of a notch 28 as shown in FIG. 2, after a pressure on the crown 2, it is no longer possible to turn the crown 2.

Advantageously, the control stem 3 has a groove 32 and the second actuating device comprises a pull-out piece 34 pivotally mounted on an element of the frame, engaged in said groove 32 and designed to actuate the second function.

The control stem 3 also has, at its end opposite the square 26, another square 36, and the first actuating device comprises an intermediate wheel 38 with a square hole through which the square 36 of the control stem 3 can slide in axial translation, said intermediate wheel 38 then being mounted integral in rotation on the square 36 with the control stem 3. The intermediate wheel 38 is held in axial translation by an element of the frame 40. Thus, the control stem 3 is designed to be free in axial translation relative to the first actuating device, in particular during the movement of the crown 2 into its depressed position. The intermediate wheel 38 is designed to actuate the first function.

In addition to the intermediate wheel 38, respectively the pull-out piece 34, the first, respectively the second actuating device, is designed to actuate, accordingly, the first function, respectively the second function.

Figure 4:
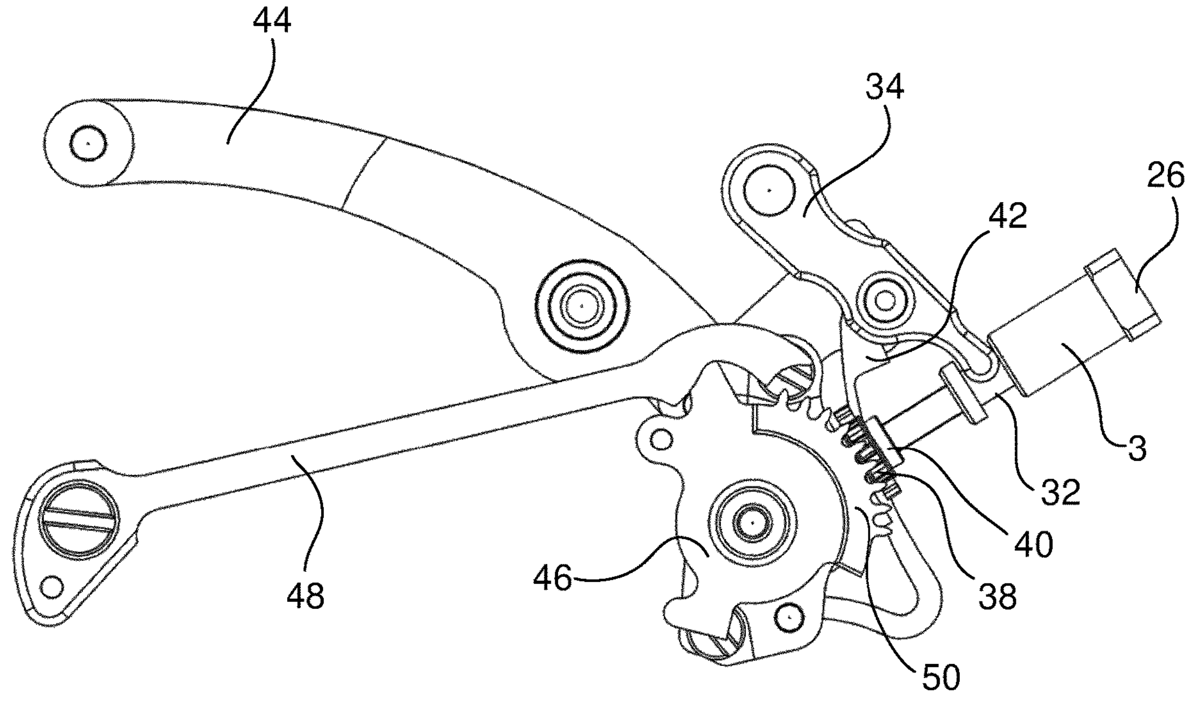
FIGS. 4 and 5 are schematic views of the control stem of the control member according to the invention, designed to control a striking selection function of a striking-mechanism of a timepiece and a START/STOP function of a chronograph mechanism, the control member being respectively in its rest position and in its depressed position.
Figure 5:
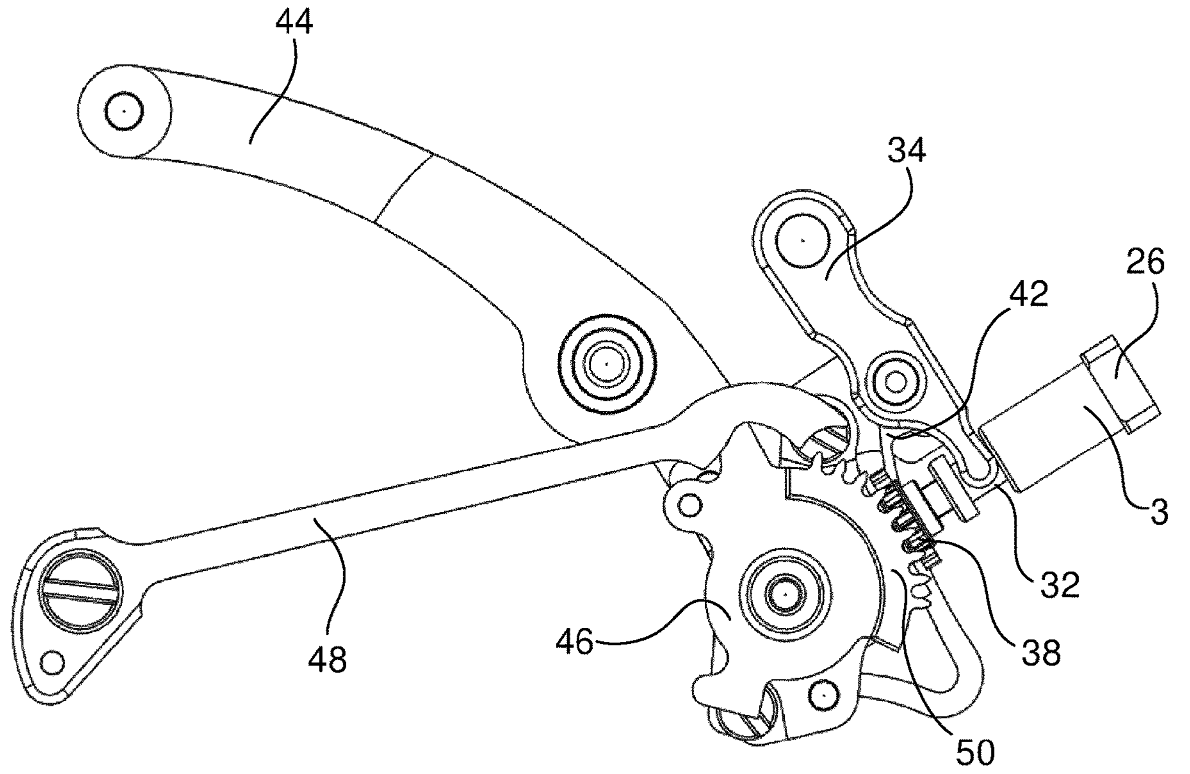

According to a first embodiment depicted in FIGS. 4 and 5, the timepiece comprises a striking-mechanism, the first function being a striking selection function, and a chronograph mechanism, the second function being one of the chronograph functions and, more particularly, the START/STOP function.

The control member 1 (crown 2+control stem 3) is therefore designed to control, as a first function, a striking selection function of a striking-mechanism via the first actuating device and, as a second function, a START/STOP function of a chronograph mechanism via the second actuating device. In order to simplify the drawings, only the control stem 3 terminated at its end by the male square 26 which will fit into the female driving square 24 of the crown 2 is depicted.

In addition to the pull-out piece 34, the second actuating device comprises a return spring 42 of the pull-out piece 34 and a chronograph control lever 44.

In addition to the intermediate wheel 38, the first actuating device comprises a striking selector comprising a striking selection lever 46 and its jumper 48. The striking selection lever comprises a toothed sector 50 designed to mesh with the intermediate wheel 38 in order to make the lever 46 move between three angular selection positions, namely a first selection position corresponding to the absence of striking (silence position S), a second selection position corresponding to Petite sonnerie (position PS) and a third selection position corresponding to Grande sonnerie (position GS).

These different mechanisms are known to the person skilled in the art and do not need to be described in more detail.

When the control member 1 (crown 2+control stem 3) is in the rest position, as depicted in FIGS. 1 and 4, its axial rotation is not prevented such that it can be turned in both directions, the control stem 3 driving, by its square 36, the intermediate wheel 38, the latter driving, in its turn, the toothed sector 50 of the striking selection lever 46 in one direction or in the other in order to select the striking.

In order to actuate the striking selection function, the control member 1 (crown 2+control stem 3), in the rest position relative to an axial movement, is designed to be movable in axial rotation, for example, by an angle of 90°, in one direction between a first central stable angular position corresponding to the first angular selection position of the selection lever 46, namely the position S, and an actuating angular position, said actuating angular position being a second stable angular position corresponding to the second angular selection position of the selection lever 46, namely the position PS, and to be movable in axial rotation, for example, by an angle of 90°, in the other direction between said first central stable angular position and another actuating angular position, said other actuating angular position being a third stable angular position corresponding to the third angular selection position of the selection lever 46, namely the position GS.

In this embodiment, the control member 1 (crown 2+control stem 3) is designed to occupy a plurality of separate stable angular positions, here three positions which are separated from one another by an angle of 90°. For this purpose, the middle 4 includes indexing means in each of said stable angular positions. These indexing means are, for example, constituted by a positioning lyre spring 52, fixed by screwing on the middle 4 (cf. FIGS. 1 to 3), and into which the driving square 24 of the crown 2 can slide. The outer face of the driving square 24 cooperates with the lyre spring 52 for the indexation of the angular position of the control member 1 to 0, +90° and −90°.

The corresponding three angular selection positions of the selection lever 46 are guaranteed by the jumper 48.

When one of the forms of striking is selected, the control member 1 (crown 2+control stem 3) is in a stable angular position such that it is possible to actuate the start/stop of the chronograph by pressing on the crown 2, and therefore on the control member 1.

For this purpose, in this embodiment, the security device comprises three notches 28 distributed over the skirt 10 of the crown 2 so as to correspond to the three stable angular positions of the control member 1 and, therefore, to the three angular selection positions. More particularly, the central notch which corresponds to the selection position S is separated by an angle of 90° from each of the other two notches which correspond to the other two selection positions GS and PS, as shown in FIG. 3. The notch 28 corresponding to the form of striking selected is positioned above the pin 30, making possible an axial translation of the control member 1 (crown 2+control stem 3), in response to a pressure on the crown 2, in order to actuate the START/STOP function of the chronograph.

When a pressure is exerted on the crown 2, the pin 30 engages in the notch 28 such that the piston 14 and the control stem 3 are moved in axial translation towards the interior of the movement, the square 36 of the control stem 3 sliding into the square hole of the intermediate wheel 38 which remains inactive, as depicted in FIG. 2. The axial rotation of the control member 1 is no longer possible.

In its axial movement, in response to a pressure on the crown 2, the control stem 3 controls the pull-out piece 34 which itself controls the chronograph control lever 44 in order to start or stop the chronograph, as shown in FIG. 5. After relieving the pressure on the crown 2, and therefore on the control stem 3, the mechanism returns to its starting position thanks to the different return springs provided for this purpose. The control member 1 is ready for a new actuation of the START/STOP function of the chronograph, in response to a new pressure on the crown 2.

According to another embodiment depicted in FIGS. 6 to 9, the timepiece comprises a month indicating mechanism, the first function being a correction function for the month, and a chronograph mechanism, the second function being one of the chronograph functions and, more particularly, the zero-resetting or flyback function.

The control member 1 (crown 2+control stem 3) is therefore designed to control, as a first function, a correction function for the month of a month indicating mechanism via the first actuating device and, as a second function, a zero-resetting or flyback function of a chronograph mechanism via the second actuating device. In order to simplify the drawings, only the control stem 3 terminated at its end by the male square 26 which will fit into the female driving square 24 of the crown 2 is depicted.

In addition to the pull-out piece 34, the second actuating device comprises a return spring 54 of the pull-out piece 34 and a chronograph zero-resetting lever 56.

In addition to the intermediate wheel 38, the first actuating device comprises a month correction rack 58 which has a toothed sector 60 designed to mesh with the intermediate wheel 38 in order to make the rack 58 move between three angular positions, namely a first neutral position, a first angular correction position corresponding to adding one month and a second angular correction position corresponding to going back one month. The first actuating device also comprises a centering lever 62 of the control stem 3 and a centering spring 64 of the control stem 3.

These different mechanisms are known to the person skilled in the art and do not need to be described in more detail.

Figure 6:
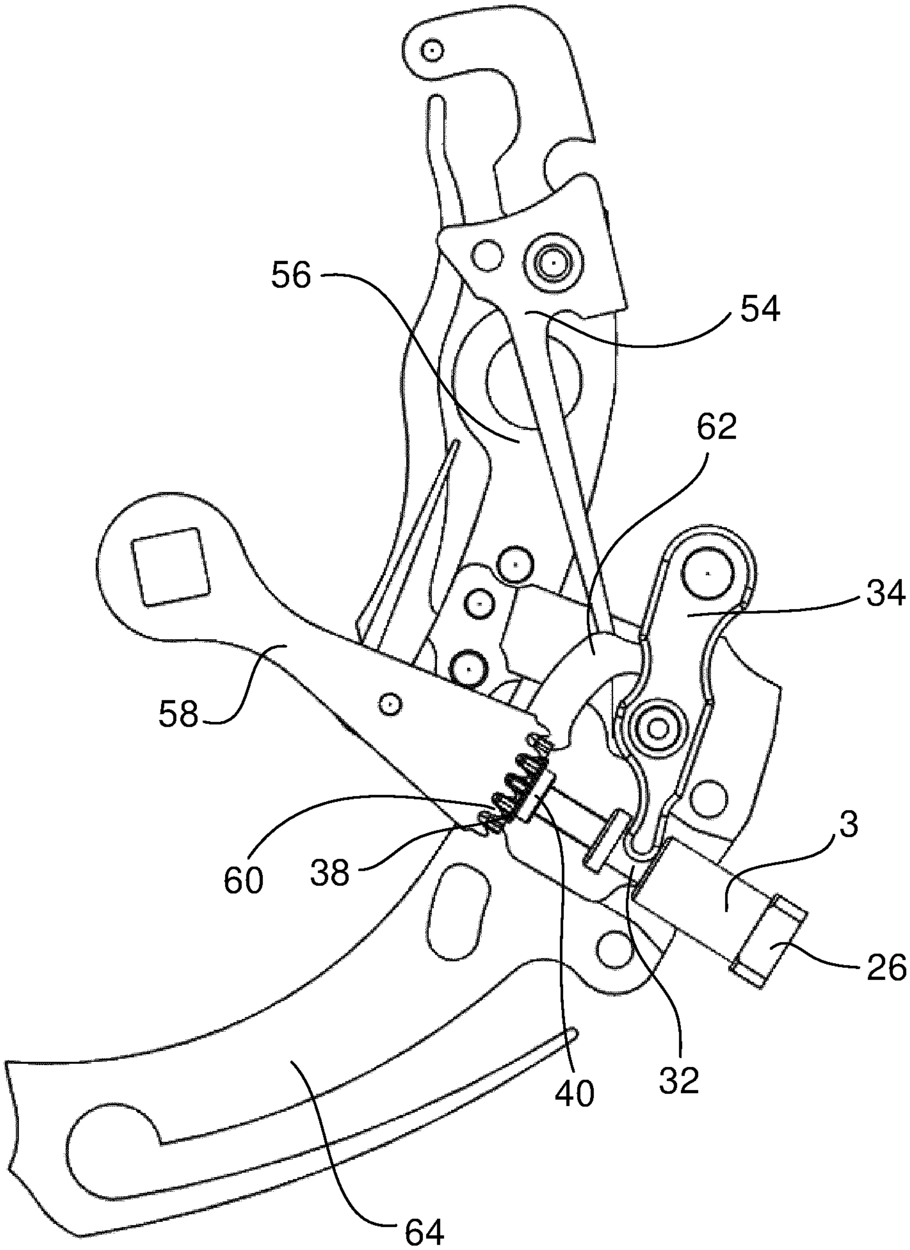
FIG. 6 is a schematic view of the control stem of the control member according to the invention designed to control a zero-resetting or flyback function of a chronograph mechanism and a correction function for the month of a month indicating mechanism of a timepiece, the control member being in its rest position.

When the control member 1 (crown 2+control stem 3) is in the rest position, as depicted in FIGS. 1 and 6, its axial rotation is not prevented such that it can be turned in both directions, the control stem 3 driving by its square 36 the intermediate wheel 38, the latter driving, in its turn, the toothed sector 60 of the correction rack 58 in one direction or in the other in order to correct the month.

Figure 7:
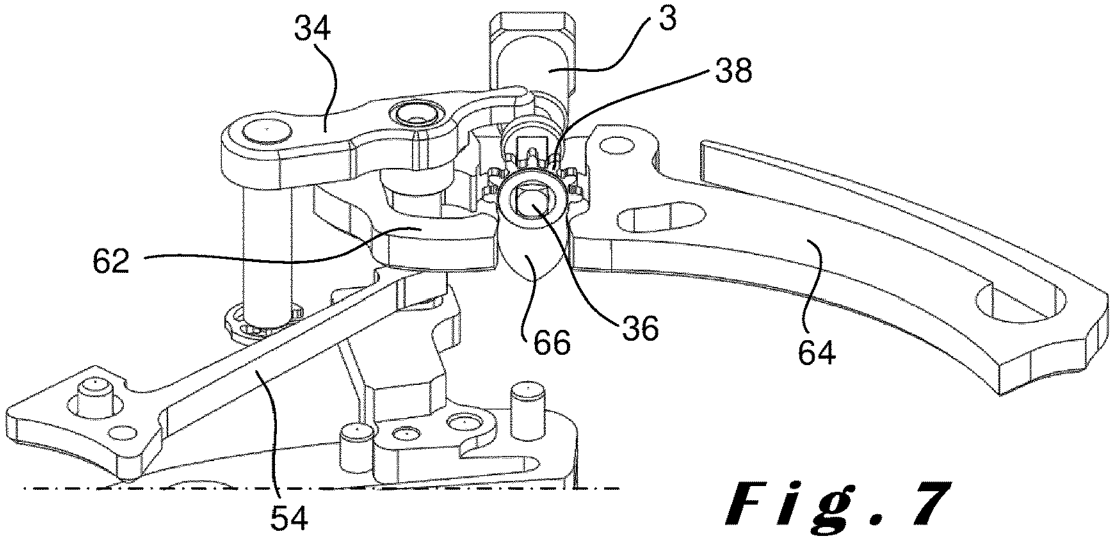
FIGS. 7 to 9 are schematic views of the control stem from FIG. 6, respectively in the neutral position, in the first unstable angular correction position and in the second unstable angular correction position.
Figure 8:
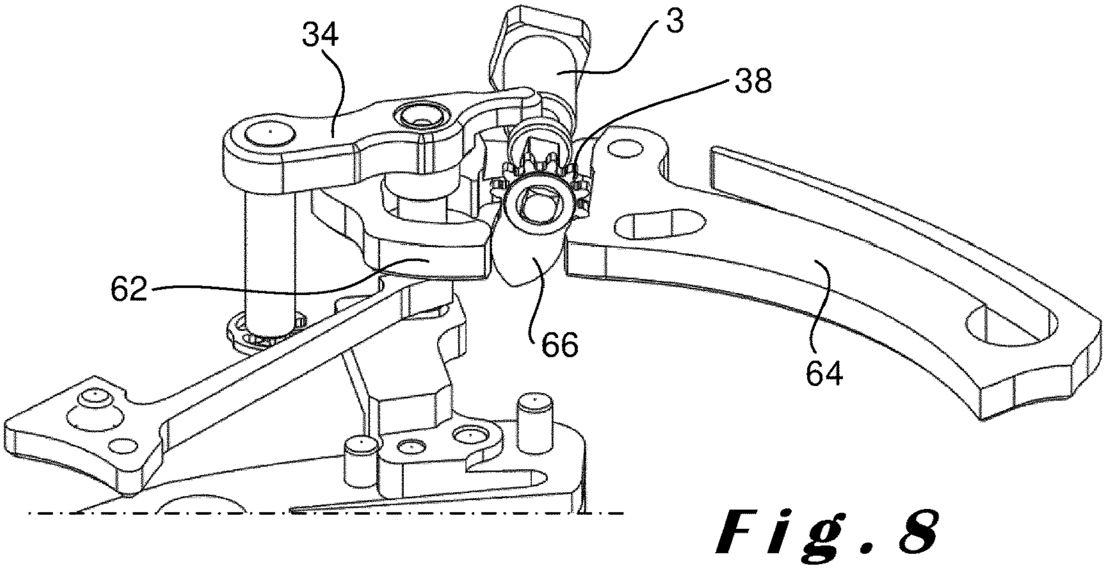
Figure 9:
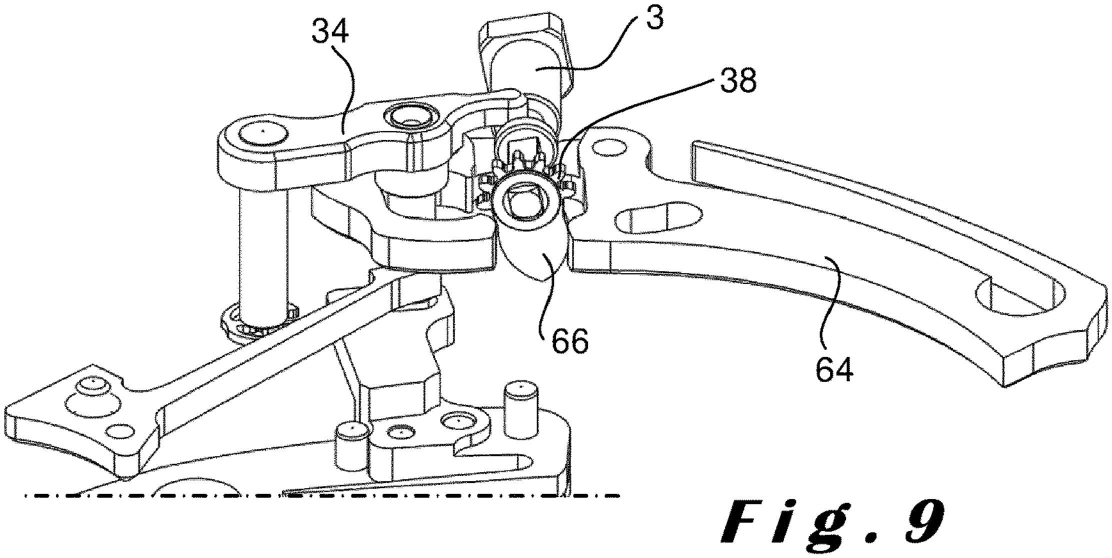

In order to actuate the correction function for the month, the control member 1 (crown 2+control stem 3), in the rest position relative to an axial movement, is designed to be movable in axial rotation, for example, by an angle of 60°, in one direction between a central stable angular position corresponding to the angular neutral position of the correction rack 58, depicted in FIG. 7, and a first actuating angular position, said first actuating angular position being a first unstable angular position corresponding to the first angular correction position of the correction rack 58, depicted in FIG. 8, and to be movable in axial rotation by an angle of 60° in the other direction between said central stable angular position and a second actuating angular position, said second actuating angular position being a second unstable angular position corresponding to the second angular correction position of the correction rack 58, depicted in FIG. 9.

In this embodiment, the control member 1 (crown 2+control stem 3) is designed to occupy a central stable angular position and two unstable angular positions, each being separated here from the central stable angular position by an angle of 60°.

The central stable angular position is guaranteed by the spring 64 and the centering lever 62 of the control stem 3 designed to act on a heart-piece 66 linked to the intermediate wheel 38 (cf. FIG. 7). During a rotation of the control stem 3, the spring 64 and the centering lever 62 act on the heart-piece 66 (cf. FIGS. 8 and 9). As soon as the couple transmitted to the control stem 3 is relieved, the spring 64 and the centering lever 62 act on the walls of the heart-piece 66 and reposition the actuating device of the correction mechanism in the neutral position and the control member 1 in its central stable angular position.

When the control member 1 (crown 2+control stem 3) is in its stable angular position, it is possible to actuate the zero-resetting of the chronograph by pressing on the crown 2, and therefore on the control member 1.

For this purpose, in this embodiment, the security device comprises a single notch 28 in the skirt 10 of the crown 2, positioned above the pin 30 when the control member 1 is in its stable angular position, making possible an axial translation of the control member 1 (crown 2+control stem 3), in response to a pressure on the crown 2, in order to actuate the zero-resetting function of the chronograph.

When a pressure is exerted on the crown 2, the pin 30 engages in the notch 28 such that the piston 14 and the control stem 3 move in axial translation towards the interior of the movement, the square 36 of the control stem 3 sliding into the square hole of the intermediate wheel 38 which remains inactive, as depicted in FIG. 2. The axial rotation of the control member 1 is no longer possible.

In its axial movement, in response to a pressure on the crown 2, the control stem 3 controls the pull-out piece 34 which itself controls the chronograph zero-resetting lever 56. A pressure on the crown 2 makes it possible to carry out a zero-resetting or a flyback of the chronograph. After relieving the pressure on the crown 2, and therefore on the control stem 3, the mechanism returns to its starting position thanks to the different return springs provided for this purpose. The control member 1 is ready for a new actuation of the zero-resetting function of the chronograph, in response to a new pressure on the crown 2.

The timepiece can comprise one or more control members of the invention, designed to actuate different first and second functions, in particular the functions of a plurality of complications.

Thus, the timepiece can comprise at 2 o'clock a control member designed to control, as a first function, a striking selection function of a striking-mechanism and, as a second function, a START/STOP function of a chronograph mechanism, as described above with reference to FIGS. 4 and 5, and at 4 o'clock, another control member designed to control, as a first function, a correction function for the month of a month indicating mechanism and, as a second function, a zero-resetting or flyback function of the chronograph mechanism, as described above with reference to FIGS. 6 to 9.

The invention makes it possible to control two different functions, in particular the functions of different complications, which are independent of one another, by means of a single control member, one of the functions being controlled by said control member just like a push-piece and the other of the functions being controlled said the control member just like a control stem. Thus, the number of control members present on the middle in order to control the different functions can be reduced.

Moreover, the crown 2 and the control stem 3, once mounted, are always integral in movement (in rotation and in translation) whether the crown 2 is in its rest position or in the depressed position, thus constituting one and the same control member 1, which advantageously makes it possible to propose a simple and robust control mechanism which is more economical to implement.

The invention claimed is:

1. A control member of a plurality of different functions of a timepiece movement, said control member comprising a crown and a control stem designed to be integral at least in rotation with said crown, said control stem being integral in rotation with a first actuating device of a first function, said crown being designed in order, in response to a pressure on said crown, to be movable in axial translation between a rest position and a depressed position in which a second function, separate from the first function, is actuated, and to return to the rest position when the pressure on the crown ceases, the crown also being designed to be, in the rest position, movable in axial rotation in at least one direction between at least one stable angular position and at least one actuating angular position so as to actuate, by rotation of said crown in said direction, said first function via the rotation of said control stem, wherein said control stem is designed so as to likewise be integral in axial translation with said crown so as to be movable in axial translation with the crown during the movement of said crown into the depressed position, and to be free in axial translation relative to the first actuating device during the movement of said crown into the depressed position, and wherein said control stem is designed to cooperate with a second actuating device of said second function during the movement of said crown into the depressed position so as to actuate said second function.

2. The control member according to claim 1, further comprising a security device designed to prevent the axial translation of the crown when the crown is not in a stable angular position and to prevent the axial rotation of the crown when the crown is not in the rest position.

3. The control member according to claim 2, wherein the crown comprises a head and a skirt integral with the head, and wherein the security device comprises at least one axial notch formed in the lateral wall of the skirt and in which a fixed pin is intended to engage in order to prevent the axial rotation of the crown when the crown is not in the rest position.

4. The control member according to claim 3, wherein said skirt is designed so that the skirt's solid lower edge is intended to be substantially in abutment against the pin when the crown is in the rest position, preventing any movement in axial translation of the crown towards the depressed position as long as the notch is not opposite said pin.

5. The control member according to claim 1, wherein the control stem has a groove and wherein the second actuating device comprises a pull-out piece engaged in said groove and designed to actuate the second function.

6. The control member according to claim 1, wherein the second function is one of the chronograph functions.

7. The control member according to claim 1, wherein the control stem has a square and wherein the first actuating device comprises an intermediate wheel with a square hole, mounted integral in rotation on the square with the control stem, said intermediate wheel being designed to actuate the first function.

8. The control member according to claim 3, wherein the first function is a selection function and wherein the at least one actuating angular position is a stable angular position corresponding to a position for selecting a function.

9. The control member according to claim 8, wherein the crown and the control stem are designed to be movable in axial rotation in one direction between a first central stable angular position corresponding to a first function selection position and an actuating angular position, said actuating angular position being a second stable angular position corresponding to a second function selection position, and to be movable in axial rotation in the other direction between said first central stable angular position and another actuating angular position, said other actuating angular position being a third stable angular position corresponding to a third function selection position.

10. The control member according to claim 9, wherein the security device comprises three notches distributed over the skirt of the crown so as to correspond to the three stable angular positions of the control member.

11. The control member according to claim 1, wherein the first function is a correction function of a mechanism and wherein the at least one actuating angular position is an unstable angular position corresponding to a correction position of the mechanism.

12. The control member according to claim 11, wherein the crown and the control stem are designed to be movable in axial rotation in one direction between a central stable angular position corresponding to a neutral position and a first actuating angular position, said first actuating angular position being a first unstable angular position corresponding to a first correction position, and to be movable in axial rotation in the other direction between said central stable angular position and a second actuating angular position, said second actuating angular position being a second unstable angular position corresponding to a second correction position.

13. The timepiece comprising at least one control member according to claim 1.

14. The timepiece according to claim 13, comprising a case including a middle, wherein the control member is designed such that the crown goes beyond the middle.

15. The timepiece according to claim 13 the middle carries a fixed pin designed to cooperate with the control member.

16. The timepiece according to claim 13, in which the control member is designed to occupy a plurality of stable angular positions, wherein the middle includes indexing means in each of the stable angular positions.

17. The timepiece according to claim 13, further comprising a chronograph mechanism and wherein the second function is one of the chronograph functions.

18. The timepiece according to claim 13, further comprising a striking-mechanism and wherein the first function is a striking selection function.

19. The timepiece according to claim 13, further comprising a month indicating mechanism and wherein the first function is a correction function for the month.

20. The timepiece according to claim 13, further comprising a striking-mechanism and a chronograph mechanism, and wherein the first function is the selection of the form of striking and the second function is the START/STOP function of the chronograph.

21. The timepiece according to claim 12, further comprising a month indicating mechanism and a chronograph mechanism, and wherein the first function is the correction of the month and the second function is the zero-resetting or flyback function of the chronograph.

22. The control member of claim 2, wherein the security device is further configured to prevent the axial rotation of the crown when the crown is in the depressed position.

* * * * *